(12) United States Patent
Clausen

(10) Patent No.: US 8,441,912 B2
(45) Date of Patent: May 14, 2013

(54) METHOD AND APPARATUS FOR DATA TRANSMISSION

(75) Inventor: Axel Clausen, Munich (DE)

(73) Assignee: Lantiq Deutschland GmbH, Neubiberg (DE)

(*) Notice: Subject to any disclaimer, the term of this patent is extended or adjusted under 35 U.S.C. 154(b) by 1344 days.

(21) Appl. No.: 11/522,800

(22) Filed: Sep. 18, 2006

(65) Prior Publication Data
US 2008/0068978 A1    Mar. 20, 2008

(51) Int. Cl.
*H04B 3/20* (2006.01)

(52) U.S. Cl.
USPC ............ 370/201; 379/417; 455/24; 455/63.1; 178/69 M; 178/69 N; 178/69 A; 178/69 B; 375/278; 375/284; 375/285; 375/296

(58) Field of Classification Search ............... 370/201, 370/278, 284, 286; 379/417; 455/24, 63.1; 178/69 M, 69 N, 69 A, 69 B; 375/278, 284, 375/285, 296, 144, 148
See application file for complete search history.

(56) References Cited

U.S. PATENT DOCUMENTS

| | | | | |
|---|---|---|---|---|
| 5,239,678 A | * | 8/1993 | Grube et al. | 455/511 |
| 5,790,551 A | * | 8/1998 | Chan | 370/458 |
| 7,508,751 B2 | * | 3/2009 | Byun et al. | 370/210 |
| 2002/0196813 A1 | * | 12/2002 | Chow et al. | 370/474 |
| 2004/0081233 A1 | * | 4/2004 | Bremer et al. | 375/222 |
| 2004/0240464 A1 | * | 12/2004 | Fite | 370/438 |
| 2005/0147043 A1 | * | 7/2005 | Schelstraete et al. | 370/236 |

OTHER PUBLICATIONS

Golden et al., Fundamentals of DSL Technology, Sep. 29, 2005, Auerbach Publications.*
Louveaux et al., Downstream VDSL Channel Tracking Using Limited Feedback for Crosstalk Precompensated Schemes, Mar. 23, 2005, IEEE, pp. 337-340.*
G. Ginis, et al., "Vectored Transmission for Digital Subscriber Line Systems," IEEE Journal on Selected Areas of Communications, Jun. 2002, pp. 1085-1104, vol. 20, No. 5, IEEE.
Very High Speed Digital Subscriber Line Transceivers 2 (VDSL2), ITU Telecommunication Standardization Sector, Feb. 2006, 1-250, G.993.2, ITU.

* cited by examiner

*Primary Examiner* — Hoon J Chung
(74) *Attorney, Agent, or Firm* — SpryIP, LLC

(57) ABSTRACT

A first device receives a first signal transmitted over a transmission line from a second device. The first signal is processed and information is generated that is related to crosstalk from other transmission lines. The information is modulated onto at least one carrier of a plurality of carriers of a second signal to be transmitted from the first device to the second device.

53 Claims, 7 Drawing Sheets

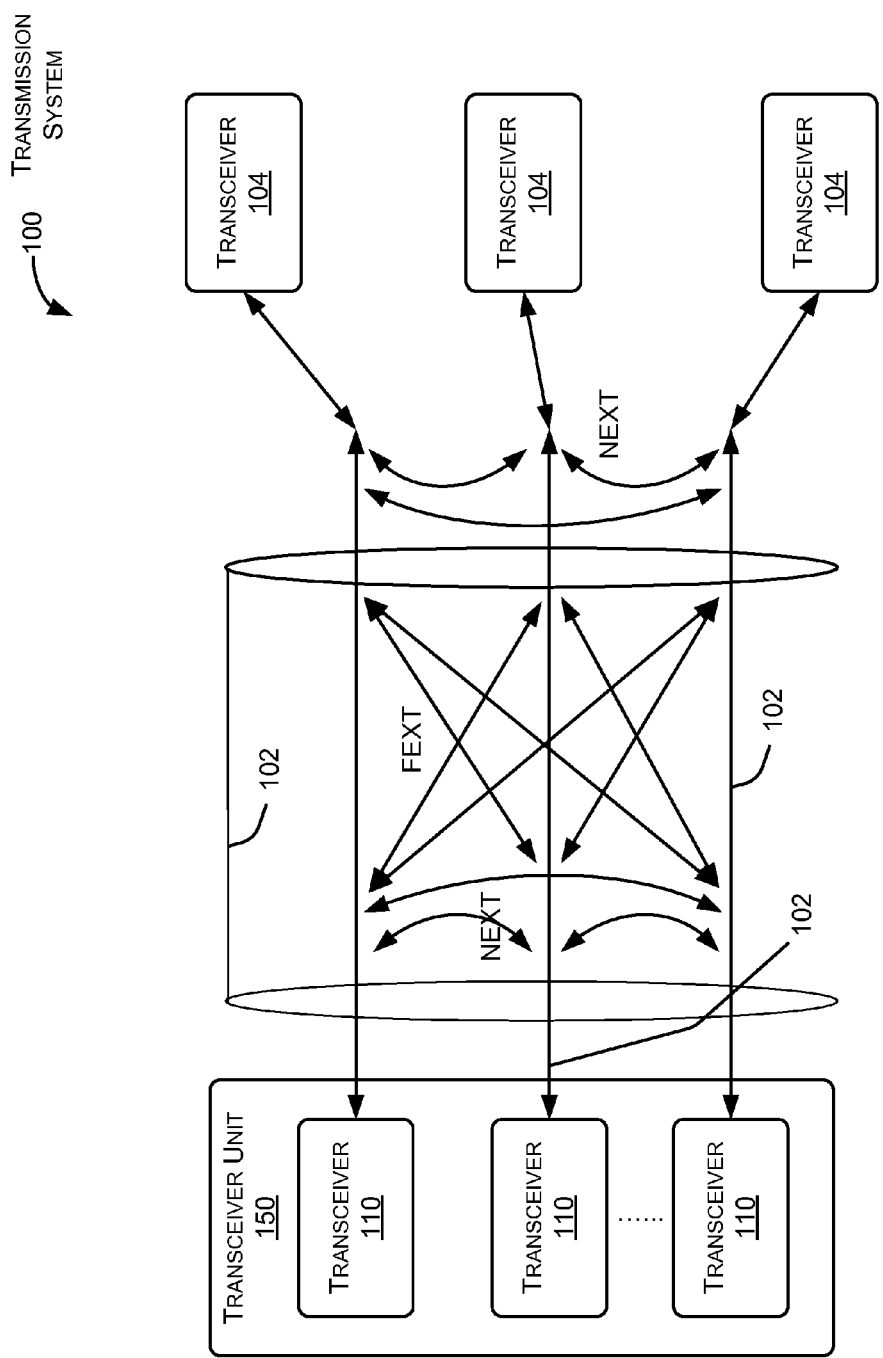

METHOD AND APPARATUS FOR DATA TRANSMISSION

REFERENCE TO RELATED APPLICATIONS

This application is related to U.S. patent application Ser. No. 11/522,801, filed Sep. 18, 2006, the contents of which are herein incorporated by reference in their entirety.

FIELD OF THE INVENTION

The invention relates generally to data transmission apparatus and methods.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

FIGS. 1a, 1b and 1c are diagrams illustrating embodiments of the invention.

DETAILED DESCRIPTION

Figure 1B:
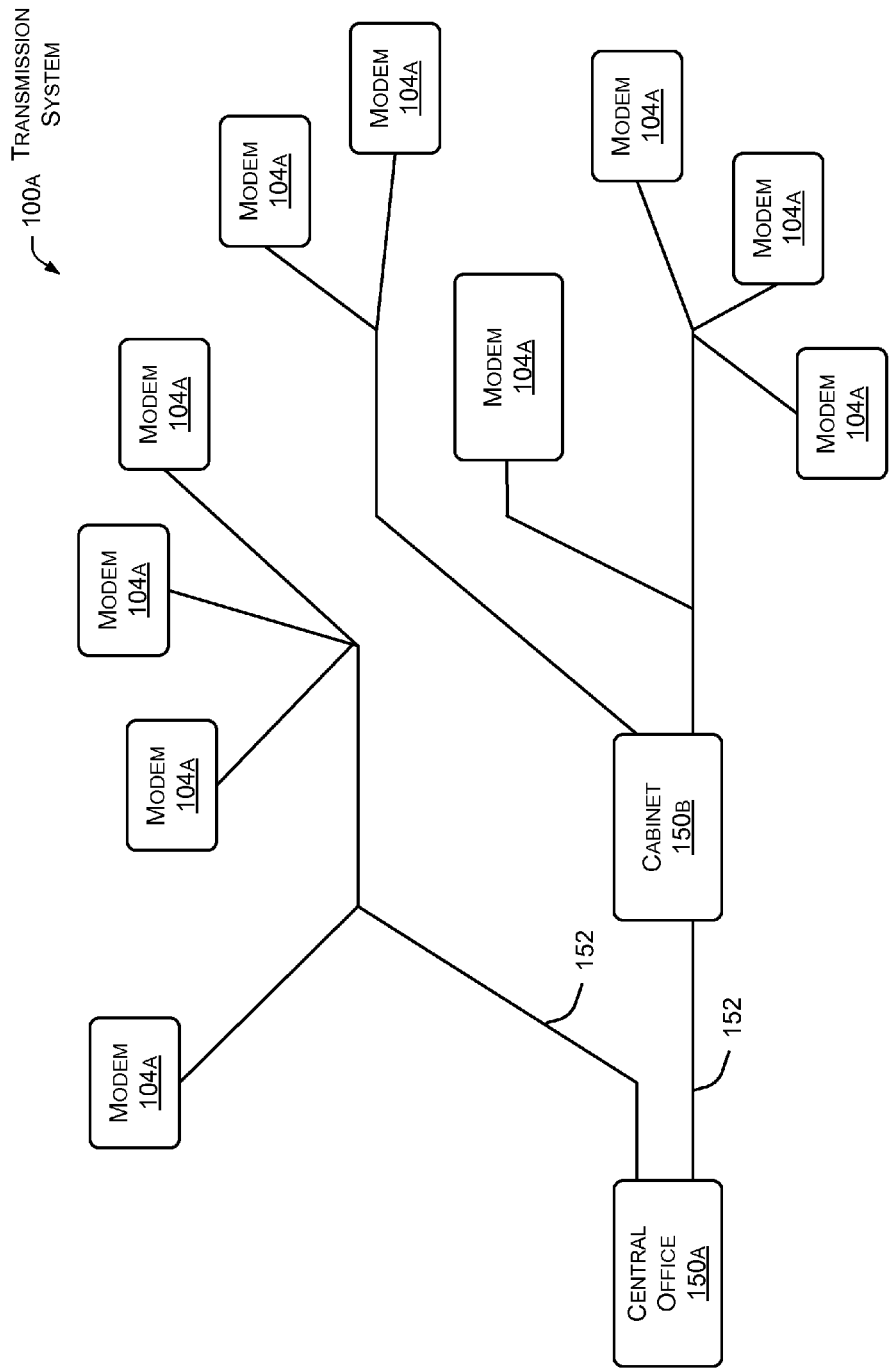

The following detailed description explains exemplary embodiments of the invention. The description is not to be taken in a limiting sense, and is made for the purpose of illustrating the general principles of embodiments of the invention. The scope of the invention, however, is defined by the claims and is not intended to be limited by the embodiments described herein.

The term "Data" as used to describe one or more embodiments of the invention is not limited to any specific data and may include for example voice data, multimedia data, text data, graphic data or other computer data.

The term "carrier" as used to describe one or more embodiments of the invention includes a tone or frequency sub-range of an equally or non-equally divided frequency range used for transmission of information on a transmission line. The term "carrier" might also be known in the art as sub carrier.

Modulation of information onto a carrier as used to describe one or more embodiments of the invention includes any assignment of information to this carrier to generate a signal comprising the information in any form within the signal. Modulation may for example comprise assignment to symbols, representatives of symbols or constellations. The assignment may use bit loadings and constellation vectors within a complex frequency domain. Modulation may according to embodiments of the present invention include QAM (Quadrature Amplitude Modulation), OFDM modulation (Orthogonal Frequency Division Multiplexing), DMT (Discrete Multitone) modulation, but is not limited thereto. 16QAM (16 Quadrature Amplitude Modulation), QPSK (Quadrature Phase Shift Keying), DQPSK (Differential Quadrature Phase Shift Keying), BPSK (Binary Phase Shift Keying) or higher modulation schemes may be used for modulation.

"Transmission line" as used to describe one or more embodiments of the invention may be interpreted broadly and includes every physical transmission medium such as electrical lines, for example twisted pair lines, copper lines, coaxial lines or other physical lines.

"Band" as used to describe one or more embodiments of the invention includes a plurality of carrier grouped together, which may be dependent on the specific standard used. The number of bands and whether they are used for upstream and/or downstream transmission may depend on the specific standard used, for example VDSL, VDSL 2, ADSL, ADSL2, ADSL2+.

The term "xDSL" as used to describe one or more embodiments of the invention may be a synonym for all DSL-based techniques including but not limited to HDSL, HDSL2, ADSLL ADSL2, ADSL2+, VDSL, VDSL2, SDSL, IDSL, G.SHDL.

In the illustrated embodiments, transmission systems can include a first device or apparatus having a transmitter that transmits signals representing information along a transmission line that couples the first device and a second device to a receiver of the second device. In many transmission systems, the first device may not only be coupled to the second device but also to one or more other devices. In some embodiments, a plurality of transmission lines are coupled to the first device and the transmission lines may be in close proximity or in contact with each other, such as with a bundle of transmission lines. As a result, crosstalk of signals transmitted on one of the transmission lines to other transmission lines can effect transmission on one or more of the plurality of transmission lines.

FIG. 1a is a diagram illustrating one embodiment of cross coupling in a transmission system 100 that includes a plurality of transmission lines 102. The transmission system 100 comprises a first transceiver unit 150 having a plurality of N transceivers 110, wherein each transceiver 110 transmits and receives signals over one or more transmission lines 102 to a plurality of transceivers 104. The plurality of transceivers 104 may for example include a Customer Premises Equipment (CPE) such as a modem or router located at the home or office of subscribers of the transmission system 100. The transceiver unit 150 may be any transceiving unit. In one embodiment transceiver unit 150 is a Central Office (CO) such as the central office 150a or a cabinet 150b as shown in FIG. 1b, as described below.

FIG. 1b is a diagram of a transmission system 100a illustrating one embodiment of telephone lines. In the illustrated embodiment, the telephone lines comprise twisted pairs of copper lines that are used to transmit signals that can include xDSL or other suitable signals from the central office 150a to a plurality of modems 104a. The telephone lines connected to the central office are arranged at least over some distance in large cable bundles 152 which may be connected to a cabinet 150b or directly connected to the modems 104a by splitting up the plurality of telephone lines of each cable bundles. Telephone lines connected between the cabinet 150b and the modems 104a may, in some embodiments, be aggregated in cable bundles which may be smaller than the cable bundles connected to Central Office 150a. In some embodiments, the transceiver unit 150 shown in FIG. 1a may be a cabinet such as the cabinet 150b shown in FIG. 1b.

Referring to FIG. 1a, the cross-coupling appearing between the transmission lines 102 may be divided into near end cross-coupling or "Near End Cross(X) Talk" (NEXT) and far end cross-coupling or "Far End Cross(X) Talk" (FEXT). In this embodiment, NEXT is the noise affecting a receiver that is located at a same end of a cable as a transmitter that is the noise source, and FEXT is the noise affecting a receiver that is located at a different end of a cable as a transmitter that is the noise source. In one embodiment, signals transmitted in a same direction can exhibit FEXT.

In the illustrated embodiments, if a direct communication channel between receivers exist (e.g. the receiver devices are coordinated), crosstalk related to FEXT may be addressed by compensation at the receiver side. In embodiments of systems where no communication channel between the receiving devices exists, compensation of FEXT at the receiver side is difficult if information regarding the data transmitted on the other transmission lines is not available at the receiver side.

In one embodiment, in order to allow compensation of crosstalk related to FEXT, a technique known as precompensation (sometimes referred in the art also as preceding or precancellation) may be used at the transmitter side. With precompensation the effect of crosstalk experienced by a signal during transmission is computed or estimated prior to transmitting the signal and the signal is modified based on this information. In various embodiments, this can be performed by subtracting the calculated crosstalk from the transmission signal or by adding the inverse of the calculated crosstalk. During transmission when the transmission signal is exposed to the crosstalk, the transmission signal and the crosstalk are summed thereby resulting in the original or nearly original, i.e. unmodified or nearly unmodified signal, as provided at the transmitting side. In some embodiments, other noise may be added during transmission.

In the illustrated embodiments, computation of the crosstalk utilizes information related to signals transmitted on other transmission lines concurrently. In some embodiments, this information is available at the transmitter side as one or more devices may transmit on the transmission lines. The information related to signals on the transmission line may be derived from the data transmitted on the transmission line. In one embodiment, this is achieved by transferring information to a central controlling machine of the transmitting device.

In some embodiments, information related to the cross coupling of transmission lines, for example, to the percentage of power that is coupled from a first transmission line to a second transmission line, may be provided with the precompensation technique. In various embodiments, the information may include crosstalk channel estimates or other information including crosstalk coupling coefficients.

Figure 1C:
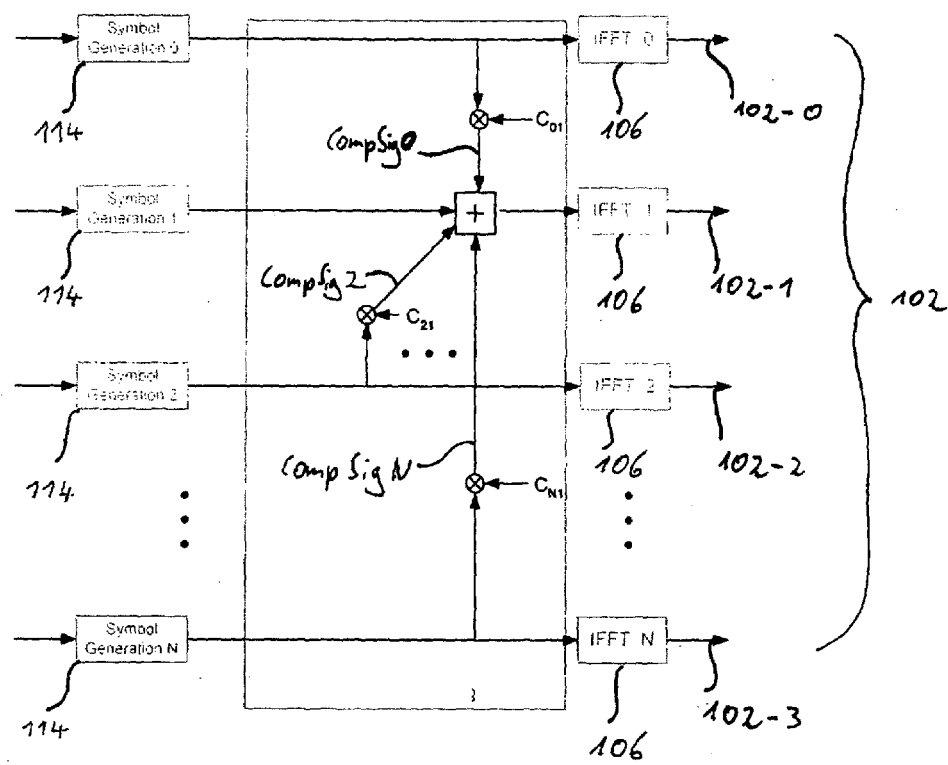

FIG. 1c illustrates a schematic view of one embodiment of precompensation at a transmitter side. As shown in FIG. 1c, for each of the plurality of transmission lines 102, a symbol generator 114 is provided for generating a symbol in the frequency domain according to information received at an input of each symbol generator 114. In one embodiment, a vector DSL-transmission may be provided wherein the signals of a plurality of DSL-transmission lines are coded and decoded simultaneously.

In various embodiments, a symbol in the frequency domain may be interpreted as a vector of constellation points for each of the carriers in the frequency domain spanned by real and imaginary axes corresponding to cosine and sine functions. The symbols generated by the symbol generators 114 may be QAM-symbols such as for example DMT-symbols or OFDM-symbols. In other embodiments, other symbols for line coding may be provided by symbol generators 114 depending on the line coding used for transmission system 100. Each of the symbol generators 114 are coupled to a frequency-to-time converter 106, for example a IFFT-unit (IFFT=Inverse Fast Fourier Transformation) converting the symbols which represent a signal in a frequency space into a signal in time space which is transmitted over transmission lines 102 to the receiver side. Between the plurality of symbol generators 104 and the plurality of frequency-to-time-converters 106, a precompensator 108 is modifying the symbols prior to converting same at the time-frequency converters 106. The precompensator 108 shown in FIG. 1c provides a linear precompensation by using for each carrier an N×N matrix providing precompensation values $C_{k,1}$. The precompensation values $C_{k,1}$ may be used to provide a plurality of compensation signals CompSig combined, i.e. added, subtracted or otherwise combined with the symbols generated by symbol generators 114. For example to provide, precompensation for the second transmission line 102-1 of the plurality of N transmission lines 102, the N-signals representing the symbols generated by symbol generators 114 other than the symbol generator corresponding to the transmission line 102-1 are each multiplied by a coefficient $C_{k,1}$ to generate compensation signals CompSig0, compSig2, . . . CompSigN which are added to the signal representing the symbol generated by the symbol generator 114 coupled to transmission line 102-1.

While the embodiment shown in FIG. 1c provides precompensation by modifying symbols in the frequency domain, it is to be noted that in other embodiments, symbols may be modified in the time domain for precompensation.

The compensation information used in embodiments of a precompensator such as the compensation coefficients of the system according to FIG. 1c may be trained and determined during a training sequence of the system, for example during initialization of one of the modems connected to the transceiver unit 150. The precompensation information may furthermore be modified during a normal operation of the system in order to allow adaptation to changes of the system or system environment.

According to embodiments of the present invention, a feedback of information related to the cross coupling experienced during the transmission signals from one transmitting apparatus to a second receiving apparatus is provided from the second receiving apparatus to the transmitting apparatus in order to allow the modification of the coefficients during training or normal operation adjustment.

Figure 2:
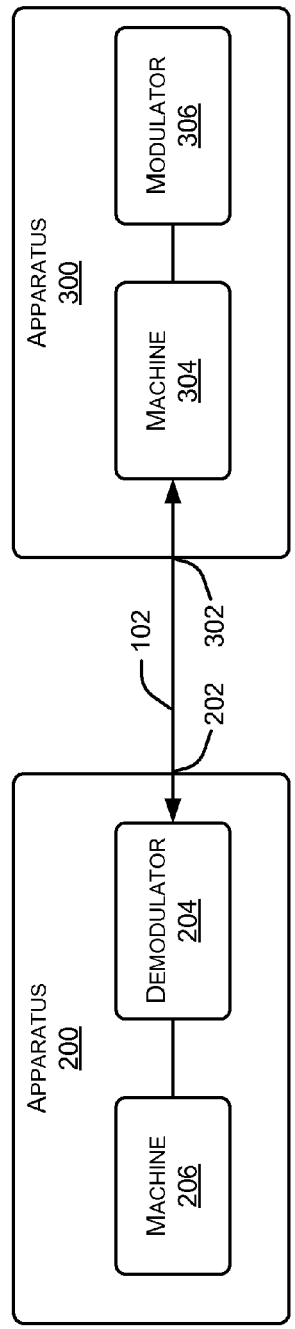
FIG. 2 is a block diagram illustrating embodiments of a transmission system.

FIG. 2 illustrates a block diagram of a transmission system 100 according to an embodiment of the present invention wherein at least one carrier of a plurality of carriers available for transmission from apparatus 300 to apparatus 200 is reserved for transmitting information related to crosstalk. The information related to crosstalk may be used in one embodiment to provide a feedback for modifying precompensation information although other usage of this information may be encompassed in other embodiments.

In the illustrated embodiment, transmission system 100 comprises a first apparatus 200, a second apparatus 300 and transmission line 102 coupling the first and second apparatus. The apparatus 200 comprises a terminal 202 receiving information modulated onto a plurality of carriers and a demodulator 204 demodulating the information for each of the plurality of carriers provided for transmission line 102 for transmission in the direction from apparatus 300 to apparatus 200.

In various embodiments, the transmission system 100 may be an xDSL system, for example a VDSL, VDSL2, ADSL, ADSL2 or ADSL2+ system. In one embodiment, the carriers provided for transmission system 100 may be divided such that a first band or a first plurality of bands of the transmission system are used for transmission in one direction, for example from apparatus 200 to apparatus 300 and a second band or a plurality of second bands are used for transmission in the opposite direction.

In the illustrated embodiment, apparatus 300 comprises an input terminal 302 receiving signals transmitted over transmission line 102. Furthermore a machine 304 is coupled to the terminal 302, the machine processing the received signal and generating information related to crosstalk added to the signal transmitted on transmission line 102 due to signals transmitted on other transmission lines. A modulator 306 is coupled to the machine 304 and modulates the information related to crosstalk onto at least one carrier of a plurality of carriers reserved for transmission of the information related to crosstalk. The modulator is coupled to the terminal 302 to transmit a signal representing the information related to crosstalk back to apparatus 200.

The apparatus 200 in one embodiment may comprise a machine 206, for example a processor, for modifying a value related to precompensation of crosstalk based on the information received on the at least one reserved carrier of the plurality of carriers.

Figure 3:
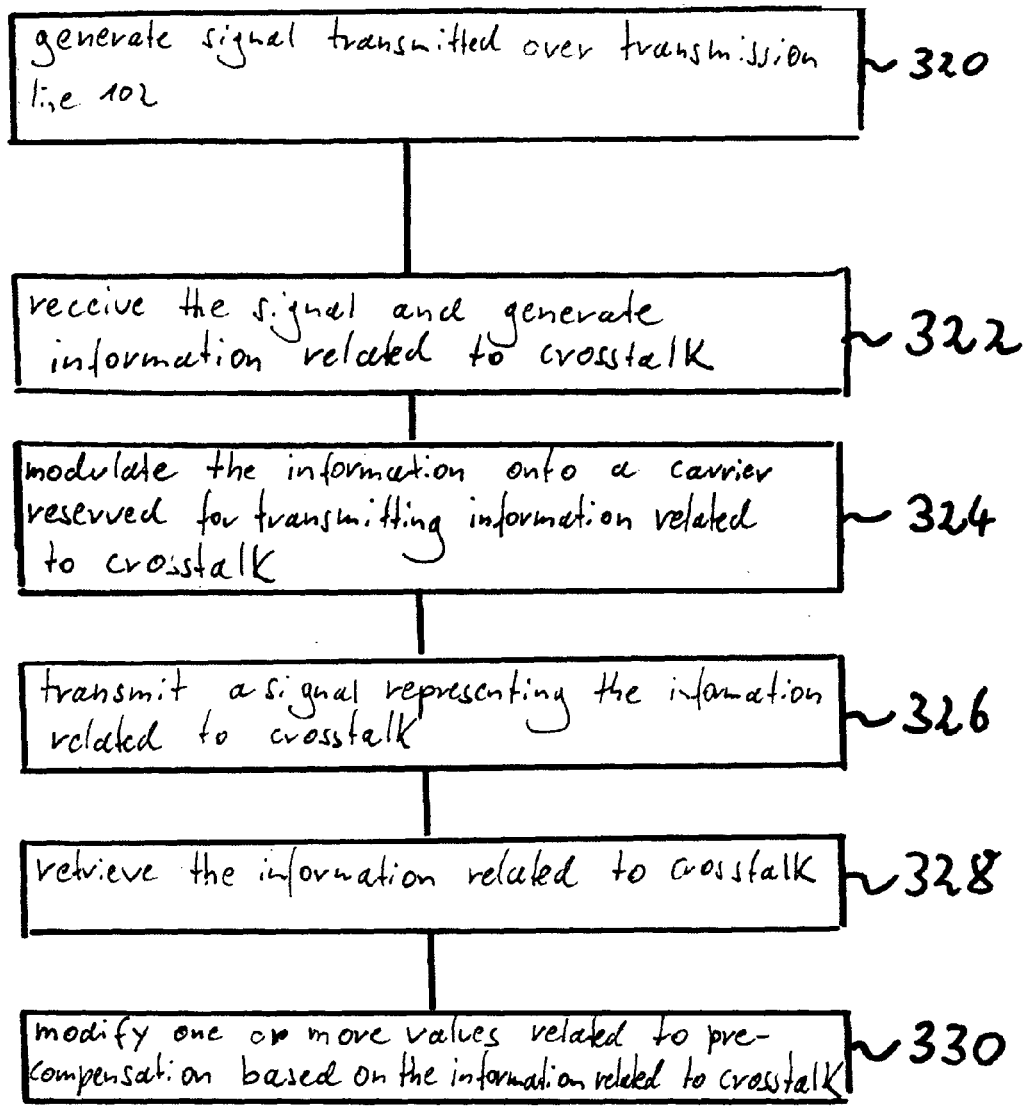
FIG. 3 is a flow diagram illustrating one embodiment of the invention.

FIG. 3 illustrates a flow diagram of one embodiment of the operation of a system illustrated in FIG. 2. It is to be noted that other flow diagrams may be provided by other embodiments. The apparatus 200 generates at step 320 a signal transmitted over transmission line 102 to apparatus 300. At step 322, apparatus 300 receives the signal and machine 304 generates information related to crosstalk. At step 324, the crosstalk information is modulated by modulator 306 onto the carrier reserved for transmitting information related to crosstalk. A signal representing the crosstalk information is transmitted over transmission line 102 to apparatus 200 at step 326. Then, demodulator 204 retrieves at step 328 the information related to crosstalk by demodulating the received signal and provides the information to machine 206. Machine 206 modifies in a step 330 one or more values related to precompensation, such as in one embodiment a precompensation coefficient based on the information related to crosstalk.

In the illustrated embodiments, information related to crosstalk may be full information of the crosstalk during the transmission such as a crosstalk channel matrix or reduced information such as for example related to a decision error made during the demodulation of a signal received at terminal 302. In one embodiment, the decision error for each carrier is quantized to further reduce the size of the crosstalk information. According to one embodiment, the decision error is separately quantized for the real (cosine) and imaginary (sine) part of the decision error for each carrier. Thus, according to this embodiment, for each carrier only the sign of the error of the real part and the sign of the error of the imaginary part is transmitted back from apparatus 300 to apparatus 200.

According to one embodiment, apparatus 300 may be an xDSL transceiver such as an xDSL modem and apparatus 200 may be an xDSL transceiver such as a CO transceiver. For example, apparatus 300 may be a VDSL 2 modem and apparatus 200 may be a VDSL 2 transceiver of a CO.

According to one embodiment, the reserved carrier is selected to be more robust, i.e. less sensitive than other carriers to noise originating from cross coupling of signals transmitted on other transmission lines or other influences or noise from either the environment or the system itself.

According to embodiments, a carrier reserved for transmission of information related to crosstalk is a carrier which is known to the system as a carrier used for transmission of information related to crosstalk. A reserved carrier includes in one embodiment an exclusively reserved carrier which is reserved and used only for transmission of the information related to crosstalk and other data are transmitted on other carriers but not on the reserved carrier. Thereby, the crosstalk information is transferred to the apparatus 200 by using only the at least one carrier reserved for transmission of crosstalk information and not other available carriers which are provided by the system for transmission from apparatus 300 to apparatus 200 and may be used to transfer other data from apparatus 300 to apparatus 200. According to one embodiment, the reserved carrier may be a non-exclusively reserved carrier wherein the carrier is reserved and used for transmission of the crosstalk information and may allow in addition a usage of the reserved carriers for transmission of other low-rate information such as control information. According to one embodiment, switching between a state wherein the at least one carrier is exclusively reserved and a state wherein the at least one carrier is non-exclusively reserved may be provided.

According to one embodiment, a switching between a state wherein the at least one carrier is reserved and a state wherein reservation is no longer made for the at least one carrier is provided. Switching may occur dependent on for example the Signal-to-Noise on the transmission line, the number of carriers available for transmission from the apparatus 300 to apparatus 200 and other criteria of the transmission systems which may vary in time. For example, the maximum number of carriers reserved for crosstalk information may be changed during operation of the first device reservation may be made as long as the maximum number of carriers reserved for transmission over the transmission line from the first device to the second device does not fall below a predetermined limit. When the number of available carriers drops below the threshold, reservation is cancelled and free for transmission of all sort of data.

According to one embodiment, switching between a state wherein the at least one carrier is reserved and a state wherein the at least one carrier is no longer reserved is provided according to a predetermined scheme, for example a regular scheme. For example, according to one embodiment, the at least one carrier may be repeatedly reserved during time intervals known to the system or predetermined by the system. According to one embodiment, switching may occur every nth symbol and switching back may occur at every mth symbol. According to one embodiment, all carriers are reserved for transmission for a predetermined time interval known to the system. For example, according to one embodiment, the information related to crosstalk may be incorporated in a symbol which is transmitted every nth symbol. For example, the symbol comprising the information related to crosstalk may be transmitted every 257th symbol wherein the other 256 symbols comprise no information related to crosstalk.

In various embodiments, if the number of carriers available for transmission in the direction from apparatus 300 to apparatus 200 is reduced, for example if in a VDSL 2 system the carriers available in upstream direction from apparatus 300 to apparatus 200 are reduced or shrunken during operation from Upstream 1 and/or Upstream 2 bands to only carriers available in the Upstream 0 band, for example due to noise, the reservation may be no longer maintained. This avoids an undue reduction of the data bandwidth for other data due to the reservation of carriers for only transmission of crosstalk information. Transmission of the crosstalk information may then be switched to a transmission on the overhead channel which may provide secure transmission in the Upstream 0 band, as the Upstream 0 band is a low frequency band with low SNR.

Furthermore, according to one embodiment, apparatus 300 may receive other information from apparatus 200 such as for example information related to a new starting of transmission on one transmission line which is expected to cause distortion on transmission line 102 and apparatus 300 may provide switching as outlined above dependent on the receiving of these information, for example an expected time of occurrence or an expected degree of distortion.

According to one embodiment, apparatus 300 may comprise a state machine having a first and second state, wherein, when the state machine is in first state, the modulator modulates the information related to crosstalk onto the at least one carrier of a plurality of carriers, and when the state machine is in a second state, the data processor provides the information related to crosstalk in at least one of the data packets at predetermined bits of the at least one data packet and wherein the logic assigns the bits of the data packet to a group of the plurality of carriers by using a bit loading scheme for the group of carriers and the modulator modulates the assigned bits onto the carriers of the group of carriers. The state machine may switch from the first to the second state based on a signal received at the terminal 302 from the apparatus 200. The predetermined bits of the data packets may be bits reserved for overhead channel information, which is for example provided in the VDSL 2 standard. In other words, switching between one state where the crosstalk information are transmitted on reserved channels and one state where the crosstalk information are transmitted in an overhead channel is provided.

In various embodiments, the state machine may further comprise a state wherein the modulator modulates the information related to crosstalk onto at least one further carrier of the plurality of carriers which may or may not have been reserved for transmission of information related to crosstalk. Thus, a dynamic extension of carriers reserved for transmission of the crosstalk information is provided according to this embodiment. In one embodiment, a dynamic decreasing of one or more carriers reserved for transmission of the crosstalk information is encompassed.

In various embodiments, the modulator may use bit loading scheme for the signal transmitting the information related to crosstalk back to apparatus 200 such that a SNR margin (SNR=Signal-to-Noise ratio) of the reserved carrier is higher than SNR margins of a predetermined number of the plurality of carriers or all of the other carriers of the plurality of carriers to allow for the more robust transmission on the carriers reserved for crosstalk information. This provides a different SNR margin for the reserved carriers compared to the other carriers of the plurality of carriers. The assignment of bit loadings may according to one embodiment be provided dependent on a measured SNR.

The above described switching of carriers to include more carriers which may be dependant on a warning of a new starting of transmission on other transmission lines or other noise sources and an increased SNR margin on the carriers reserved for crosstalk information transmission provides, according to one embodiment, the more robust transmission allowing error free or low-error transmission when the transmission line 102 is subjected to massive distortion. After the system is settled again to a stable operation, the number of carriers may be again decreased in order to not take away bandwidth unnecessary. According to one embodiment, the reserved carriers are in addition secured by not providing FEXT compensation on these carriers.

In one embodiment a plurality of carriers may be reserved, i.e. the at least one carrier is not a single carrier and includes a plurality of carriers. The plurality of reserved carriers may comprise non-consecutive carriers, for example carrier No. 13, 17, 18 and 22, wherein the number is assigned in the order of the frequency related to the carrier. The plurality of carrier may also comprise consecutive carriers, for example carrier No. 3, 4, 5 and 6 or non-consecutive and consecutive carriers. Transmission of the information related to crosstalk may use all of the reserved carriers or only some of the reserved carriers. Furthermore, some or all of the reserved carriers may be exclusively reserved and some or all of the reserved carriers may be non-exclusively reserved including a switching between the exclusive state and the non-exclusive state or a switching between the reserved state (either exclusive or non-exclusive) and a nonreserved state as described above. Switching as described above may be dynamically during an operation of the transmission system.

The number of carriers reserved in various embodiments may be dependent on the algorithm chosen for modifying the precompensation information, the rate at which the precompensation information are modified and the number of bits assigned to the carriers reserved for crosstalk transmission. For example, for a VDSL 2 system wherein modification (adaptation) of the precompensation information may take place at every transmitted synchronization symbol which is every $257^{th}$ symbol, and wherein two bits of crosstalk information corresponding to the signs of the real and imaginary part of the decision error is transmitted for each carrier of 3000 carriers assigned to downstream transmission, a transmission rate of 6000 bits per each 256 symbols which is roughly equal to 24 Bits for each symbol may be provided. To achieve this data rate, three carriers each having a bit rate or bit loading of 8 bits may for example be reserved for transmission of the crosstalk information.

The apparatus 300 in various embodiments may be informed of the switching as described above by transmitting a separate signal from apparatus 200 to apparatus 300 indicating the switching of reserved carriers, modes or other switching as outlined above.

According to one embodiment, the reserved carriers may be standardized for both apparatuses 200 and 300 or permanently determined to be reserved. A memory permanently storing information related to the at least one carrier, for example information related to the indices of the carriers may be provided in apparatus 200 and apparatus 300. In one embodiment, the reserved carriers, i.e. the indices of the reserved carriers may be transmitted from apparatus 200 to apparatus 300 upon initialization of apparatus 300 for operation. Furthermore, information related to the set of carriers which may be used for switching to a higher number of carriers or information related to a switching scheme may be standardized and stored within apparatuses 200 and 300 or may be transmitted at an initialization of apparatus 300.

According to one embodiment, QAM (Quadrature Amplitude Modulation) may be used for transmission on transmission line 102. That is QAM may be provided for transmitting the signals from apparatus 200 to apparatus 300 and for transferring the crosstalk information back from apparatus 300 to apparatus 200. According to one embodiment, DMT-modulation (discrete multitone modulation) may be used wherein a DMT-symbol is generated by modulating the crosstalk information onto the at least one carrier (either a single carrier or a plurality of carriers) reserved for transferring the crosstalk information and modulating other data such as user data onto the other carriers of the DMT-symbol. Thus, modulator 306 may be a DMT-modulator and demodulator 204 may be a DMT-demodulator.

According to one embodiment, the modulator 306 of apparatus 300 may comprise a logic assigning bits of the information related to crosstalk to the at least one carrier according to a bit loading scheme for the at least one carrier and the modulator modulates the assigned bits onto the at least one carrier. Furthermore, according to one embodiment, a data processor providing a plurality of data packets comprising a plurality of bits is provided and the logic assigns the plurality of bits to other carriers of the plurality of carriers according to a bit loading scheme for the other carriers and the modulator 306 modulates the assigned bits onto the other carriers of the plurality of carriers.

Apparatus 200 may further in various embodiments comprise a selector reserving the at least one carrier among the plurality of carriers for transmission of only information related to crosstalk. The selector may permanently store information related to the at least one carrier and wherein the selector may reserve the at least one carrier based on the permanently stored information. The selector may receive information related to a signal-to-noise ratio of a transmission line coupled to the terminal and reserve the at least one carrier based on the information related to the signal-to-noise ratio. The selector may reserve the at least one reserved carrier only if the maximum number of carriers reserved for receiving information at the terminal exceeds a predetermined limit. The selector may further change a maximum number of carriers reserved for receiving information at the terminal dynamically. The selector may further provide a signal indicating that the at least one carrier is no longer reserved for transmission of only information related to crosstalk. The selector may provide according to one embodiment a signal indicating that at least one further carrier is reserved for transmission of only information related to crosstalk dependent on a new starting of transmission on a second terminal connected over a further transmission line to a further apparatus. The signal is then transmitted to apparatus 300 for information about the starting of transmission on a further transmission line. It is to be noted that upon a new starting of transmission on one or more of the plurality of transmission lines, precompensation provided at apparatus 300 may be out of balance as no accurate information related to the coupling coefficients related to the newly operated transmission device is available at the time of starting transmission. The signal informing about the new starting of transmission on a further transmission line may be used by apparatus 300 to take measures for transmitting data on transmission line 102. According to one embodiment, apparatus 300 may start an initialization period upon receiving a signal indicating a start of operation of one or more apparatuses coupled to the terminal and the selector may select the at least one further carrier during the initialization period and provide information related to the further carrier during the initialization period.

According to one embodiment, the apparatus 200 comprises a bit loading selector selecting a bit loading for the plurality of carriers based on a signal-to-noise ratio of each of the plurality of carriers, and the bit loading selector selects the bit loading for the at least one carrier by subtracting a first margin from the signal-to-noise ratio of the at least one carrier and the bit loading selector selects the bit loading for the other carriers of the plurality of carriers based on a SNR of the respective other carriers subtracted by a second margin, wherein the first margin is different from the second margin.

It is to be noted that the above embodiments or parts of the described embodiments may be implemented by hardware, software, firmware or combinations thereof.

According to one embodiment, a computer program for controlling transmitting information related to crosstalk, the computer program comprising program code, when executed on a computing system, instructing the computing system to perform the generating of information related to crosstalk from other electrical lines onto the electrical line by processing a first signal and assigning the information related to crosstalk to at least one carrier of a plurality of carriers, wherein the at least one carrier is reserved for transmitting the information related to crosstalk from the first device to the second device. Furthermore, according to one embodiment, a computer program for modifying a value related to precompensation of crosstalk, the computer program comprising program code, when executed on a computing system, instructing the computing system to perform demodulating information for each of a plurality of carriers, separating information transmitted on at least one carrier of the plurality of carriers from information transmitted on other carriers of the plurality of carriers, and modifying a value related to precompensation of crosstalk based on the separated information.

With respect to FIGS. 4a and 4b, further exemplary embodiments of the apparatuses 200 and 300 which may be used for example in a VDSL 2 transmitting system will now be described.

Figure 4A:
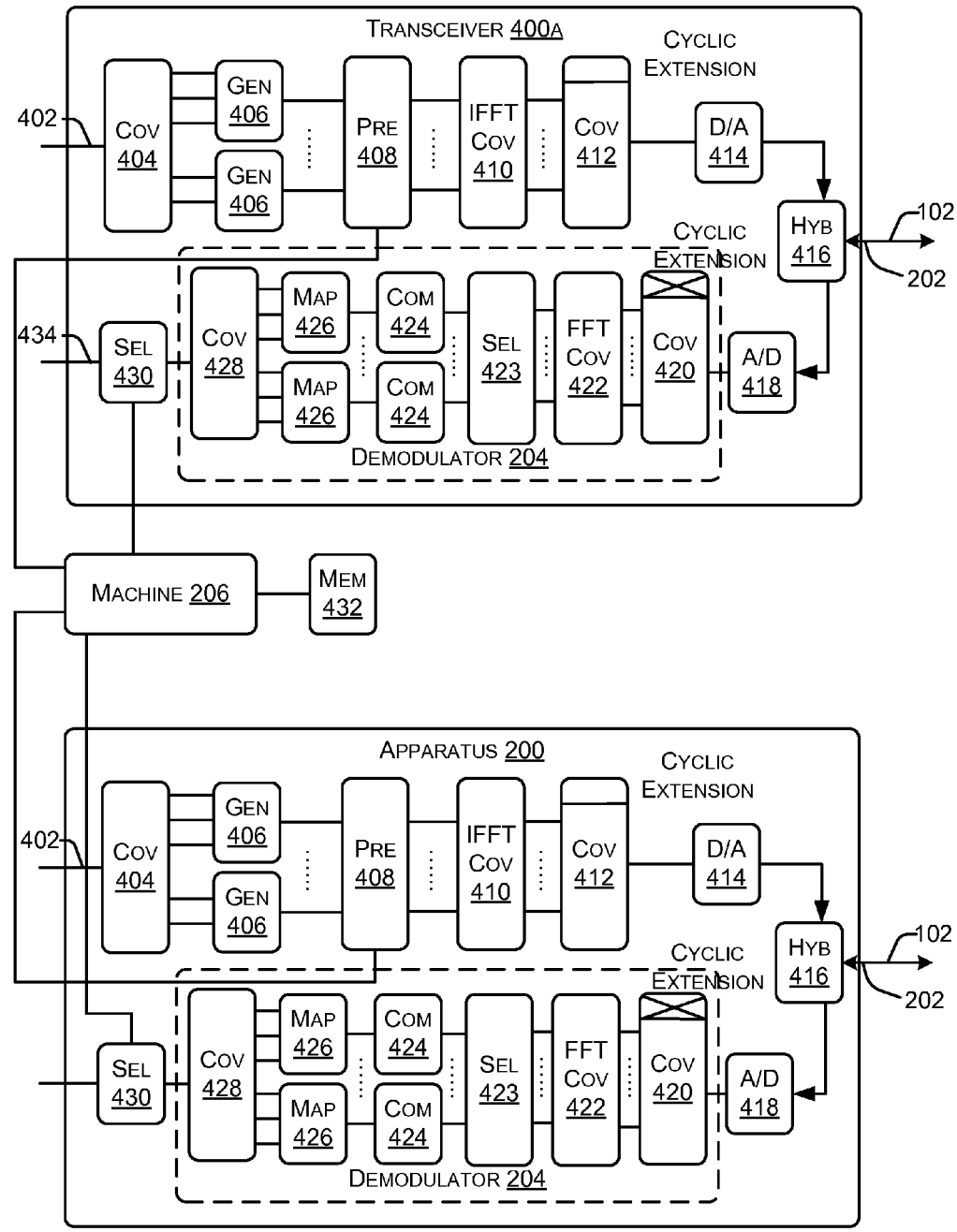
FIGS. 4a and 4b are block diagrams illustrating embodiments of the invention.
Figure 4B:
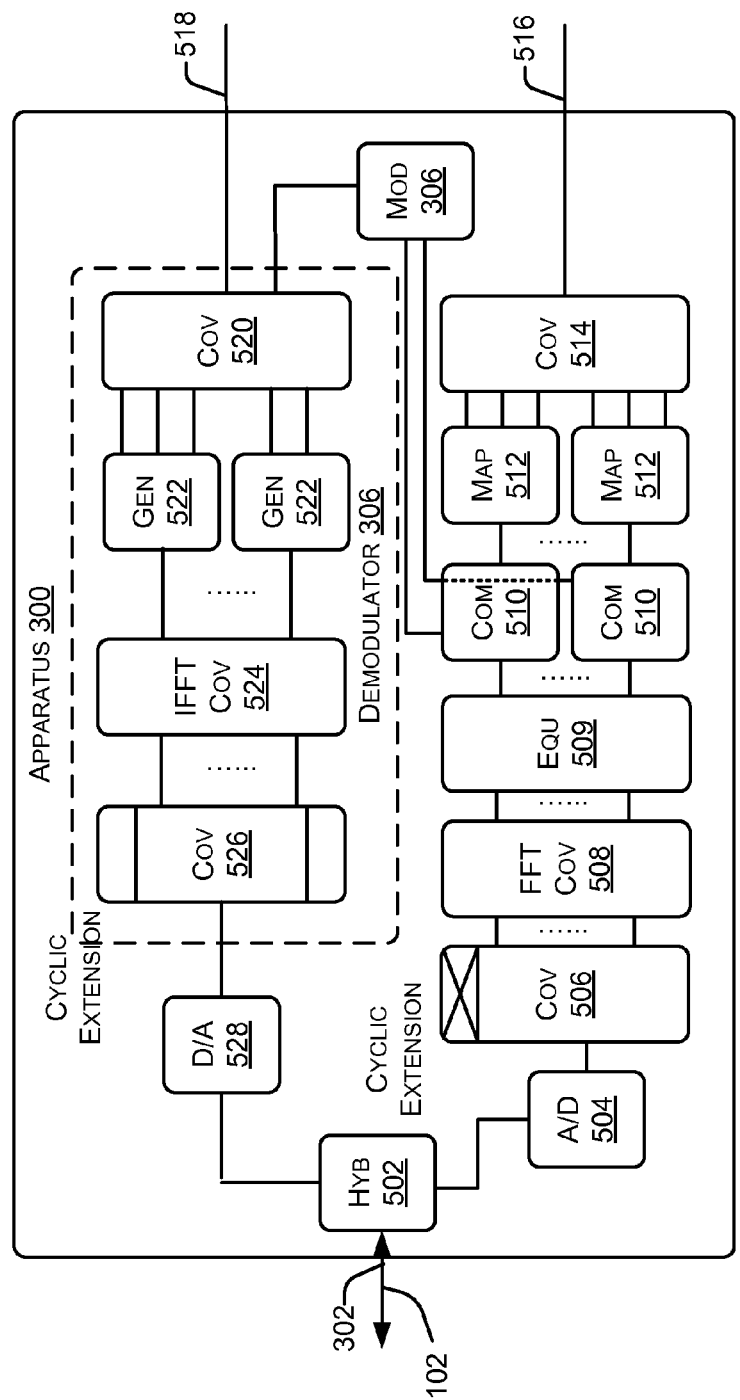

FIGS. 4a and 4b are block diagrams illustrating embodiments of the invention. FIG. 4a shows apparatus 200 having a first and second transceiver 400a and 400b. Each of the transceivers comprises in a transmitting path a data input 402, a first serial-parallel converter 404 and a plurality of symbol-generators 406 coupled to the outputs of the serial-parallel converter 404. An input of a precompensator 408 is coupled to the output of the plurality of symbol generators 406 and an output of the precompensator is coupled to the input of an IFFT frequency-time converter 410. The output of the IFFT frequency-to-time converter is coupled to the input of a first parallel-to-serial converter 412. The parallel-to-serial converter adds a cyclic extension to the output signals of the IFFT frequency-time converter 410 and converts the signals into a serial data stream comprised of DMT-data symbols. The DMT-data symbols are provided to the input of a digital-to-analog converter (D/A converter) 414. The output of the D/A converter is connected to a first terminal of a hybrid circuit 416. The hybrid circuit 416 of each transceiver 400a and 400b is connected to a respective transmission line 102 for transmitting the analog signal to apparatus 300.

In the illustrated embodiment, the hybrid circuit 416 receives an analog transmission signal from transmission line 102 and provides a digital representative of the received transmission signal via an analog-to-digital converter 418 to the demodulator 204. The output of the analog-to-digital converter 418 in one embodiment is coupled to an input of a second serial-to-parallel converter 420. The second serial-to-parallel converter 420 receives the digital signal and removes the cyclic extension added to the signal. The outputs of the serial-to-parallel converter 420 are coupled to a plurality of inputs of a FFT time-to-frequency converter 422. The outputs of the FFT time-to-frequency converter 422 are coupled to a frequency domain equalizer 423. The outputs of the frequency domain equalizer 423 are coupled to a plurality of comparators 424 for comparing each output signal representing a complex vector in frequency space with an expected vector in frequency space. The output of each of the comparator is connected to respective bit mappers 426 mapping the constellation vector to bit values. An input of a second parallel-to-serial converter 428 mapping the plurality of bit values received in parallel at the inputs to a single data stream at the output of the parallel-to-serial converter 428 according to a bit loading scheme. The output of the parallel-to-serial converter 428 is connected to a selector 430 separating the data related to crosstalk from other data. It is to be noted that various modification of the connection of selector 430 are possible. For example, the selector may be integrated within the parallel-to-serial converter 428 or the converter may be directly coupled to respective outputs of the bit mappers 426. The selector 430 is coupled at a first output to a data output providing the data transmitted on carriers other than the reserved carriers to a data output 434. The selector 430 is further coupled at a second output to the machine 206. Machine 206, as described above, modifies values of the precompensation information used by precompensator 408 for example as described with respect to FIG. 1c based on the received information related to crosstalk. Machine 206, as described above, may be a processor executed by software or firmware with computer algorithms for training the precompensation information or modifying the precompensation information during normal operation. Machine 206 may be coupled to a memory 432 for storing the actual precompensation values used by the precompensator 408. Memory 432 may also store information related to the indices of the carriers which is provided to the selector 430 for determining which data corresponding to the reserved carriers may be separated. Memory may, according to an embodiment, also be coupled to the data input 402 of each of transceiver 400a and 400b to store the data transmitted by transceivers 400a and 400b.

FIG. 4b illustrates an embodiment of the apparatus 300 which may be used for VDSL 2 transmission. As described above, the input terminal 302 of apparatus 300 is connected to transmission line 102. A hybrid circuit 502 is connected to terminal 302 for separating receiving and transmitting signals. A receiving signal is passed to an analog-to-digital converter 504 connected to a first serial-to-parallel converter 506. The serial-to-parallel converter 506 removes the cyclic extension and passes the received bits to a FFT time-to-frequency converter 508. Outputs of the FFT time-to-frequency converter are coupled to a frequency domain equalizer 509. Outputs of the frequency domain equalizer 509 are coupled to a plurality of comparators 510 comparing the received data representing complex vectors in a frequency space to expected vectors. The plurality of comparators 510 is coupled to a plurality of bitmappers 512 mapping the constellation vectors to respective bits. The plurality of bitmappers 512 is coupled to a parallel-to-serial converter 514 converting the parallel received bits to a serial data stream provided at a data output 516.

In the transmitting path illustrated for embodiments of apparatus 300, a data input 518 of the modulator 306 is coupled to a second serial-to-parallel converter 520. The second serial-to-parallel converter 520 is coupled to a plurality of symbol generators 522 having outputs coupled to inputs of an IFFT-frequency-to-time converter 524. The outputs of the IFFT-frequency-to-time converter 524 are coupled to inputs of a second parallel-to-serial converter 526 adding a cyclic extension to the received parallel data and converting same to a serial data stream provided to an input of a D/A converter 528. The D/A converter 528 is coupled to the hybrid circuit 502 for transmitting the analog signal over transmission line 102.

In the embodiment shown in FIG. 4b, the machine 306 generating information related to crosstalk is coupled to each of the comparators 510. The machine 306 receives, for example, from the comparators 510 information related to a decision such as the real and imaginary part of an error between the received constellation vector and an expected constellation vector in the frequency domain for each carrier. The machine 304 may reduce the received information to generate the information related to crosstalk by determining, for example, the sign of the decision error for the real and imaginary part of each carrier. The information related to crosstalk are then provided to serial-to-parallel converter 520 for providing the information to the respective symbol generators corresponding to the carriers reserved for transmission of crosstalk information. As described above, the carriers or the number of carriers reserved for transmission of crosstalk information may according to one embodiment be dynamically switched during operation of apparatus 300.

While embodiments have been described with respect to apparatus 200 to have a plurality of transmitters or transceivers within one unit, it is to be noted that some or all of the plurality of transmitters may be located on a single chip or on different chips or within different housings which are coupled to transfer the information related to the data send over the plurality of transmission lines.

Although the invention has been illustrated and described with respect to one or more implementations, alterations and/or modifications may be made to the illustrated examples without departing from the spirit and scope of the appended claims. In particular regard to the various functions performed by the above described components or structures (blocks, units, assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, any direct connection or coupling between two points, functional blocks, devices or other physical or functional units shown or described herein can be implemented by indirect connection or coupling including further elements or functional blocks in-between. For example, one or more equalizers in time or frequency domain, filters, interfaces or drivers may be provided depending on requirements of specific embodiments. Furthermore, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method comprising:
    receiving, at a first device, a first signal transmitted over a transmission line from a second device to the first device;
    generating, by processing the first signal, information related to crosstalk added to the first signal transmitted on the transmission line due to signals transmitted concurrently on other transmission lines;
    modulating the information related to crosstalk onto at least one carrier of a plurality of carriers of a second signal to be transmitted from the first device to the second device, wherein the at least one carrier is reserved exclusively for transmission of the information related to crosstalk from the first device to the second device.

2. The method according to claim 1, wherein modulating the information onto the at least one carrier comprises modulating the information onto the at least one carrier by using quadrature amplitude modulation.

3. The method according to claim 1, wherein the first signal and the second signal are generated with discrete multitone modulation.

4. The method according to claim 1, wherein the at least one carrier is reserved for transmission of only the information related to crosstalk from the first device to the second device.

5. The method according to claim 4, further comprising changing the maximum number of carriers reserved for transmission over the transmission line from the first device to the second device during operation of the first device; and
 wherein the at least one carrier is reserved for transmission of only the information related to crosstalk until the maximum number of carriers reserved for transmission over the transmission line from the first device to the second device falls below a predetermined limit.

6. The method according to claim 1, further comprising:
 transmitting the second signal from the first device to the second device;
 retrieving the information related to crosstalk at the second device; and
 modifying a value for precompensation of crosstalk by using the information related to crosstalk.

7. The method according to claim 1, further comprising:
 providing a plurality of data packets comprising a plurality of bits;
 assigning the plurality of bits to carriers of the plurality of carriers other than the at least one carrier according to a bit loading scheme for the other carriers; and
 modulating the assigned bits onto the other carriers.

8. The method according to claim 7, wherein receiving the first signal, generating the information related to crosstalk and modulating the information related to crosstalk are repeated until a third signal is received at the first device, and wherein after the receiving of the third signal the information related to crosstalk are provided in at least one of the data packets transmitted from the first device to the second device at predetermined bits of the at least one data packet.

9. The method according to claim 8, wherein the third signal is generated and transmitted to the first device when the maximum number of carriers reserved for transmission from the first device to the second device falls below a predetermined limit.

10. The method according to claim 8, wherein the predetermined bits of the at least one data packet are bits reserved for overhead channel information.

11. The method according to claim 1, wherein a SNR margin of the at least one carrier is higher than a bit SNR margin of a predetermined number of carriers of the plurality of carriers.

12. The method according to claim 11, wherein the signal-to-noise ratio margin of the at least one carrier is higher than the SNR margin of all carriers of the plurality of carriers.

13. The method according to claim 12, wherein modulating the information related to crosstalk comprises:
 assigning a plurality of bits of the information to the at least one carrier by using a bit loading scheme assigned to the at least one carrier, wherein the bit loading scheme is assigned to the at least one carrier such that the signal-to-noise ratio margin of the at least one carrier is higher than a SNR margin of all other carriers of the plurality of carriers; and
 modulating the assigned bits onto the at least one carrier.

14. The method according to claim 13, further comprising:
 measuring a signal-to-noise ratio for each carrier of the plurality of carriers;
 assigning a bit loading to the at least one carrier based on a signal-to-noise ratio of the at least one carrier subtracted by a first SNR margin; and
 determining a bit loading for each of the other carriers of the plurality of carriers based on a signal-to-noise ratio of each respective carrier subtracted by a second SNR margin, wherein the second SNR margin is different from the first SNR margin.

15. The method according to claim 1, wherein information related to indices of the at least one carrier is permanently stored in the first and second device.

16. The method according to claim 1, further comprising:
 measuring a signal-to-noise ratio for the plurality of carriers; and
 reserving the at least one carrier for the transmission of information related to crosstalk based on the measured signal-to-noise ratio.

17. The method according to claim 1, further comprising:
 receiving a fourth signal at the first device from the second device related to informing of a distortion to be expected on the transmission line.

18. The method according to claim 17, wherein the second device generates the fourth signal prior to a starting of transmission of signals on a second transmission line connecting the second device to a third device.

19. The method according to claim 17, further comprising:
 based on the receiving of the fourth signal, modulating the information related to crosstalk onto at least one further carrier of the plurality of carriers.

20. The method according to claim 19, further comprising:
 transmitting information related to indices of the at least one carrier during an initialization period of the first and second devices.

21. The method according to claim 20, further comprising:
 transmitting the information related to the indices of the at least one further carrier from the second device to the first device.

22. The method according to claim 1, wherein the first device is a xDSL modem.

23. The method according to claim 1, wherein the at least one carrier is reserved for transmission of the information related to crosstalk during a predetermined time interval.

24. The method according to claim 23, wherein all carriers of the plurality of carriers are reserved for transmission of the information related to crosstalk during a predetermined time interval.

25. The method according to claim 23, wherein every nth symbol comprises the information related to crosstalk.

26. The method according to claim 1, wherein the information related to crosstalk includes at least a crosstalk channel matrix.

27. The method according to claim 1, wherein the information related to crosstalk includes at least quantized decision error information related to at least one carrier.

28. A method comprising:
 assigning at least one carrier of a plurality of carriers of a transmission line between a first device and a second device for transmission of only information related to crosstalk added to a signal transmitted over the transmission line due to signals transmitted concurrently on other transmission lines; and
 repeatedly transmitting the information related to crosstalk from the first device to the second on the at least one carrier.

29. The method according to claim 28, wherein an SNR margin of the at least one carrier of the transmission line is higher than an SNR margin of the other carriers of a predetermined number of the plurality of carriers of the transmission line.

30. The method according to claim 28, further comprising: adapting at least one value related to precompensation of crosstalk based on the information related to crosstalk.

31. The method according to claim 28, further comprising: switching a state of the at least one carrier from being reserved for transmission of only the information related to crosstalk to being a carrier available for transmission of other information, wherein data not related to the information related to crosstalk is transmitted on the at least one carrier between the repeatedly transmitted information related to crosstalk, the at least one carrier being available for transmission of other information when the data not related to the information related to crosstalk is transmitted.

32. The method according to claim 28, wherein the information related to crosstalk includes at least a crosstalk channel matrix.

33. The method according to claim 28, wherein the information related to crosstalk includes at least quantized decision error information related to at least one carrier.

34. An apparatus comprising:
a first input terminal receiving a first signal;
a machine processing the first signal and generating information related to crosstalk added to the first signal transmitted over a transmission line due to signals transmitted concurrently on other transmission lines;
a modulator modulating the information related to crosstalk onto at least one carrier of a plurality of carriers, the at least one carrier being reserved exclusively for transmission of the information related to crosstalk.

35. The apparatus according to claim 34, wherein the modulator modulates the information onto the at least one carrier by using a quadrature amplitude modulation.

36. The apparatus according to claim 34, wherein the at least one carrier is reserved for transmission of only the information related to crosstalk from the first device to the second device.

37. The apparatus according to claim 34, wherein the modulator comprises:
a logic assigning bits of the information related to crosstalk to the at least one carrier according to a bit loading scheme for the at least one carrier; and wherein the modulator modulates the assigned bits onto the at least one carrier.

38. The apparatus according to claim 37, further comprising:
a data processor providing a plurality of data packets comprising a plurality of bits;
wherein the logic assigns the plurality of bits to other carriers of the plurality of carriers according to a bit loading scheme for the other carriers; and
wherein the modulator modulates the bits assigned by the logic onto the other carriers of the plurality of carriers.

39. The apparatus according to claim 38, further comprising a state machine having a first state and second state, wherein when the state machine is in the first state, the modulator modulates the information related to crosstalk onto the at least one carrier of the plurality of carriers, and when the state machine is in the second state, the data processor provides the information related to crosstalk in at least one of the data packets at predetermined bits of the at least one data packet and wherein the logic assigns the bits of the data packet to a group of the plurality of carriers by using a bit loading scheme for the group of carriers and the modulator modulates the assigned bits onto the carriers of the group of carriers.

40. The apparatus according to claim 39, wherein the state machine switches from the first state to the second state based on a third signal received at the first input terminal.

41. The apparatus method according to claim 39, wherein the predetermined bits of the data packets are bits reserved for overhead channel information.

42. The apparatus according to claim 37, wherein the bit loading scheme assigned to the plurality of bits provides a SNR margin of the at least one carrier higher than a SNR margin of a predetermined number of the other carriers of the plurality of carriers.

43. The apparatus according to claim 34, further comprising: a memory storing the information related to the at least one carrier; and a machine selecting the at least one carrier based on the information related to the at least one carrier.

44. The apparatus according to claim 34, further comprising:
a state machine, wherein the state machine comprises a third state, the modulator modulating the information related to crosstalk onto at least one further carrier of the plurality of carriers when the state machine is in the third state.

45. The apparatus according to claim 34, wherein the apparatus is a xDSL transceiver.

46. The apparatus according to claim 34, wherein the information related to crosstalk includes at least a crosstalk channel matrix.

47. The apparatus according to claim 34, wherein the information related to crosstalk includes at least quantized decision error information related to at least one carrier.

48. A computer program for controlling transmitting information related to crosstalk, the computer program comprising program code, the program code stored in a non-transitory computer readable storage medium and when executed on a computing system, instructs the computing system to perform:
generating the information related to crosstalk from other transmission lines onto a transmission line by processing a first signal; and
assigning the information related to crosstalk to at least one carrier of a plurality of carriers, wherein the at least one carrier is reserved exclusively for transmitting the information related to crosstalk from a first device to a second device.

49. The computer program comprising the program code, the program code stored in the non-transitory computer readable storage medium, according to claim 48, wherein the information related to crosstalk includes at least a crosstalk channel matrix.

50. The computer program comprising the program code, the program code stored in the non-transitory computer readable storage medium, according to claim 48, wherein the information related to crosstalk includes at least quantized decision error information related to at least one carrier.

51. A method, comprising:
at a transceiver, computing a precompensation coefficient in advance of transmitting a signal;
modifying the signal using the precompensation coefficient;
receiving information related to crosstalk, the information received on a carrier reserved for only crosstalk information; and
adapting the precompensation coefficient using the information related to the crosstalk.

52. The method according to claim 51, wherein the information related to crosstalk includes at least a crosstalk channel matrix.

53. The method according to claim 51, wherein the information related to crosstalk includes at least quantized decision error information related to at least one carrier.

* * * * *